March 3, 1964 W. A. POORE 3,123,381
HITCH
Filed May 17, 1963 3 Sheets-Sheet 1

Inventor
Wesley A. Poore
By Charles L. Schwab
Attorney

March 3, 1964  W. A. POORE  3,123,381
HITCH

Filed May 17, 1963  3 Sheets-Sheet 2

Inventor
Wesley A. Poore
By Charles L. Schwab
Attorney

Inventor
Wesley A. Poore
By Charles L. Schwab
Attorney

United States Patent Office 3,123,381
Patented Mar. 3, 1964

3,123,381
HITCH
Wesley A. Poore, Cedar Rapids, Iowa, assignor to Allis-Chalmers Manufacturing Company, Milwaukee, Wis.
Filed May 17, 1963, Ser. No. 282,197
6 Claims. (Cl. 280—405)

This invention relates to a hitch for interconnecting tractor and trailer units of an articulated vehicle.

Heretofore, some tractor scraper type earth movers have comprised a two wheel tractor and a two wheel scraper interconnected for articulated steering movement about a vertical pivot axis. Some of the two wheel tractor, two wheel scraper earth movers include a yoke forming a part of the articulated hitch and having legs extending rearwardly to connect to the bowl portion of the scraper on a transverse pivot axis. This transverse axis is disposed forwardly of the axis of the scraper wheels. In such an earth mover, when the bowl is lowered, for instance to a digging position, the front of the tractor is raised thereby detrimentally reducing forward vision of the operator.

Also it has previously been suggested that the front wheels of a four wheel tractor which is articulatively connected to a trailing vehicle, be raised off the ground so as to transfer weight to the rear driving wheels of the tractor. One such prior art device is shown in Harvey W. Rockwell's Patent U.S. 2,936,039, issued May 10, 1960, on a vehicle steering and control apparatus. This prior device, however, requires considerable space on the tractor and requires ram connecting points on the tractor for the tractor tilting rams. Further, the tilting hitch arrangement of U.S. Patent 2,936,039 cannot be employed on a two wheel type tractor of the hereinbefore mentioned type without requiring considerably more space than the usual tractor scraper hitch. Also such an installation would require considerable modification of the two wheel type tractor.

It is an object of this invention to provide an improved hitch in an articulated tractor and trailer vehicle for raising and lowering the front of the tractor.

It is a further object of this invention to provide a hitch of the type hereinbefore described which requires a minimum amount of mounting space on the tractor and does not require points on the tractor for connecting the tilt rams.

It is a further object of this invention to provide a compact hitch mechanism connected to the tractor on a longitudinal axis and to the trailer on a vertical axis and including means for varying the angle between the longitudinal and vertical axes.

Further, it is an object of this invention to provide a hitch which will be useful for either a two wheel or a four wheel tractor used to pull a wheeled trailer articulatively connected thereto.

It is a further object of this invention to provide a compact hitch attachment adapted for connection to a tractor on a longitudinal axis and to a trailer on a vertical axis including means for varying the angle between the longitudinal and vertical axes and which may be installed optionally using the same connecting members on the tractor and the trailer which are used for a conventional tractor scraper hitch.

These and other objects and advantages of this invention will be apparent when the following description is read in conjunction with the drawings in which.

Figure 1:
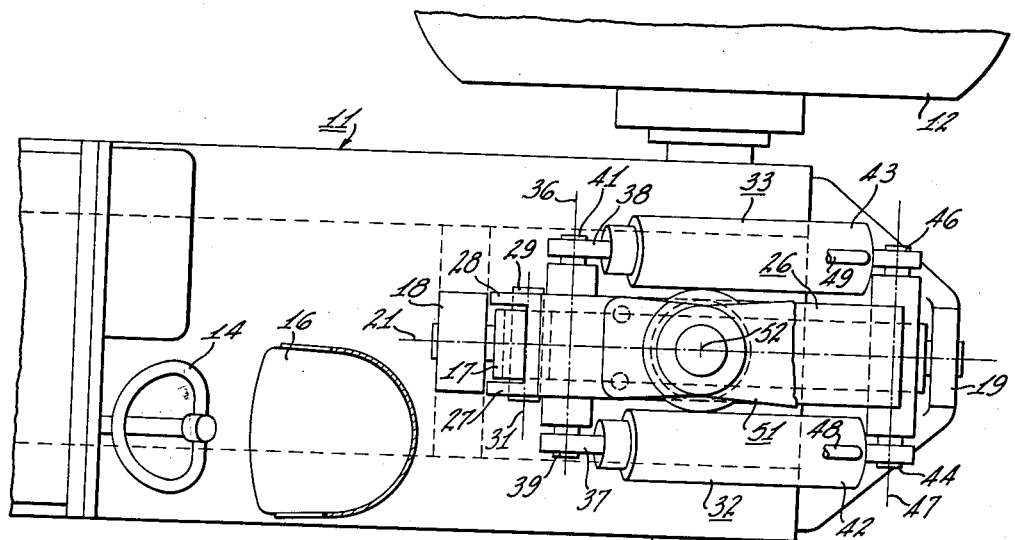
FIG. 1 is a top view of the tractor with a hitch embodying this invention.
Figure 2:
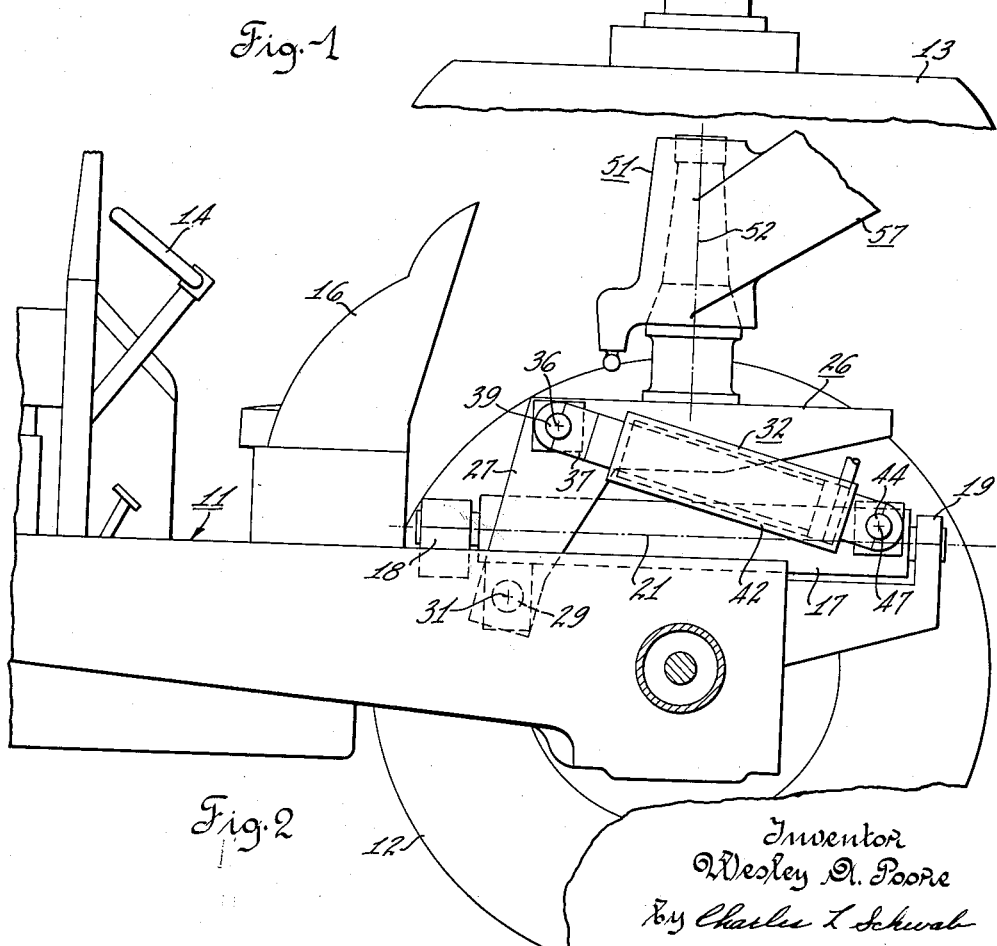
FIG 2 is a side view of the tractor shown in FIG. 1 with the left driving wheel removed.

Referring to FIG. 1, a tractor unit 11 has a pair of driving wheels 12, 13 powered in a conventional manner by an engine, not shown, carried on the tractor unit 11. A manually operated steering control 14 and an operator seat 16 are provided on the tractor unit 11. Referring also to FIG. 2, a horizontal kingpin member 17 is pivotally connected to the tractor unit 11 by a pair of brackets 18, 19 for pivotal movement about a longitudinal axis 21. A vertical kingpin member 26 has a pair of downwardly extending legs 27, 28 which are pivotally connected to the horizontal kingpin member 17 by a pin 29 for rotation about a horizontal axis 31, extending transversely of the tractor unit 11.

The forward ends of a pair of single acting rams 32, 33 are pivotally connected to the vertical kingpin member 26 on a transverse axis 36. As illustrated, the hydraulic rams or motors 32, 33 include the piston components 37, 38, pivotally connected to a pair of pins 39, 41 extending outwardly at each of the laterally opposite sides of the vertical kingpin member 26 and cylinders 42, 43 the rear ends of which are pivotally connected, respectively, to pins 44, 46 extending outwardly at laterally opposite sides of the horizontal kingpin member 17 so as to pivot about a transverse axis 47. Pressure fluid is admitted to the rams 32, 33 by conduits 48, 49 connected to a conventional pressure fluid source, not shown. A trailing unit 51 is pivotally connected to the kingpin member 26 for vertical pivotal movement about a vertical axis 52.

Figure 3:
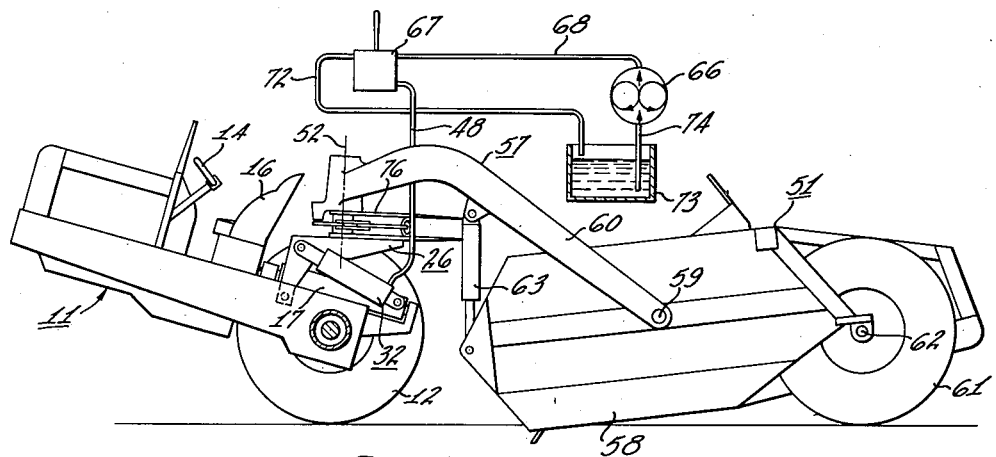
FIG. 3 is a side view of an earth mover using this invention.

Referring to FIG. 3, the trailing unit 51 is a scraper having a yoke 57 pivotally connected at its forward end to the vertical kingpin 26 and pivotally connected at the rear ends of its legs 60 to a bowl 58 on a transverse axis 59. A pair of wheels 61 are pivotally secured to the rear of the bowl 58 for rotation about a transverse axis 62. A hydraulic motor in the form of a ram 63 is pivotally connected at its opposite ends to the yoke 57 and the bowl 58. Actuation of the ram 63 changes the vertical position of the bowl 58. The hydraulic control system for hitch rams 32, 33, is shown in FIG. 3. A hydraulic pump 66 supplies fluid under pressure to a control valve 67 through conduit 68. Fluid may be directed by the control valve 67 to the working side of the single acting rams 32, 33, through conduit 48. Conduit 72 carries fluid from the control valve 67 to the reservoir 73. Fluid is supplied to pump 66 from reservoir 73 by a conduit 74. Steering mechanism 76 pivots the tractor unit 11 about the vertical pivot axis 52. This steering mechanism is similar to that illustrated in the before mentioned Rockwell Patent 2,936,039.

Figure 4:
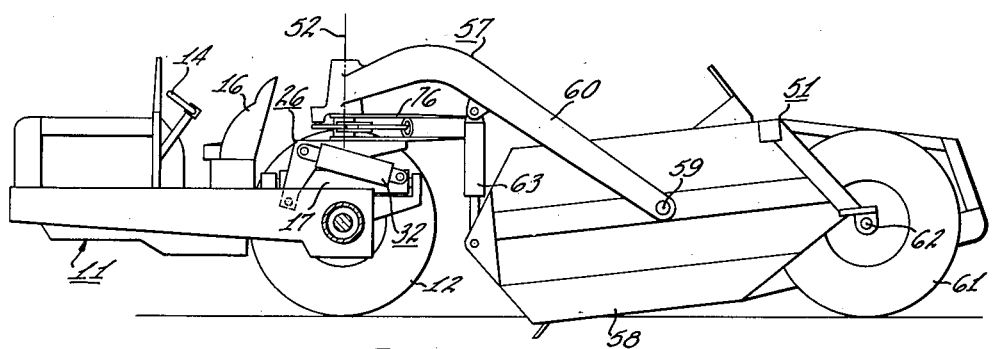
FIG. 4 is a side view of the vehicle shown in FIG. 3 with the tractor leveled and the scraper in a digging position.
Figure 5:
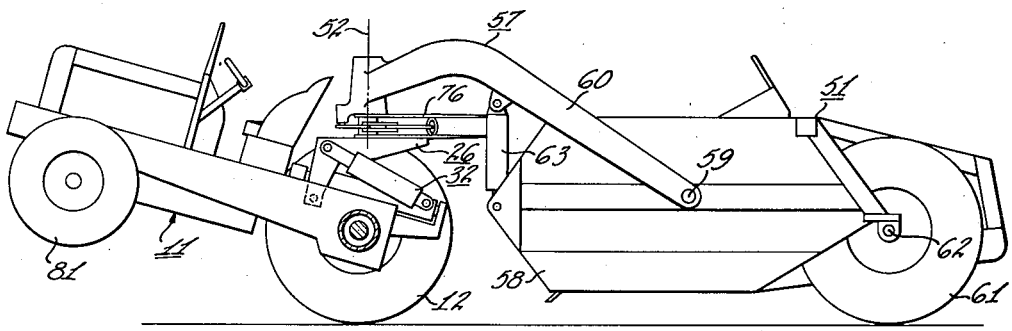
FIG. 5 is a side view of a four wheel tractor and a two wheel scraper with the front wheels of the tractor raised off the ground.

As illustrated in FIGS. 1 and 2, the scraper bowl of trailing unit 51 is not in a digging position, but rather is in a transport position as illustrated in FIG. 5. When the scraper bowl is lowered to the position shown in FIG. 3 with the rams 32, 33 held in the same position illustrated in FIGS. 1 and 2, the front end of the tractor 11 will be raised upwardly to the position shown in FIG. 3. A raised condition of the front end of the tractor is undesirable in that the operator's forward visibility is reduced appreciably. To level the tractor to the condition shown in FIG. 4, the operator merely permits a portion of the fluid to escape to the reservoir from rams 32, 33 by adjustment of control valve 67. With the tractor in the position shown in FIG. 4, the operator is in a good position to operate the tractor scraping unit in a most efficient manner. Thus it is seen that the hitch construction hereinbefore described has particular utility in a two wheel tractor unit, for an earth mover wherein the yoke of the scraper unit is pivotally connected to the bowl on a transverse axis 59 which is forwardly of the axis 62 of the wheels supporting the scraper bowl. In this type of unit lowering of the scraper bowl will raise the front end of the tractor and by utilizing the compact hitch construction of my invention the operator may selectively level the tractor to place himself in a better position of observation to more safely operate the tractor scraper earth mover.

As illustrated in FIG. 5, the scraper bowl 58 is in a carry or transport position and the rams 32, 33 have been expanded so as to raise the front wheels of the tractor unit off the ground. In this condition steering of the tractor scraper unit is accomplished by the steering mechanism 76 rather than the Ackerman steering which may be conventionally provided for the front wheels. In the raised position of the front wheels the weight normally carried by the front wheels 81 is now carried by the rear tractor wheels 12, 13. The increased weight placed upon the traction wheels 12, 13 will increase the traction and hence increase the pulling power for the tractor. In FIG. 5, the front end of the tractor has been raised higher than is necessary to obtain the increased traction. Actually the front wheels need only be raised off the ground a few inches or it may not be necessary to raise the front wheels completely out of ground contact in some conditions.

Figure 6:
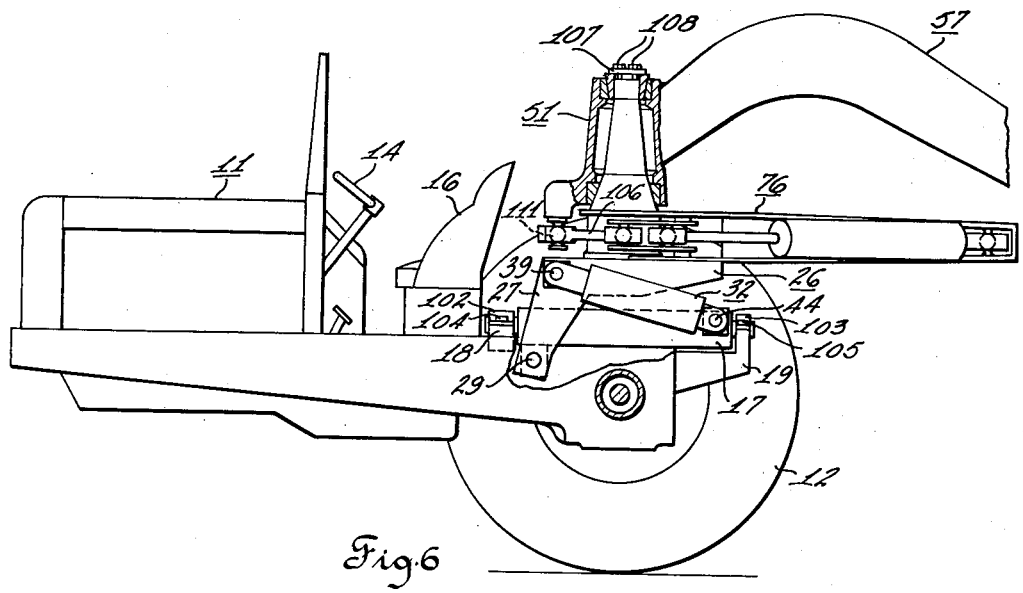
FIG. 6 is a side view of a two wheel tractor with my hitch, and showing additional details of construction.
Figure 7:
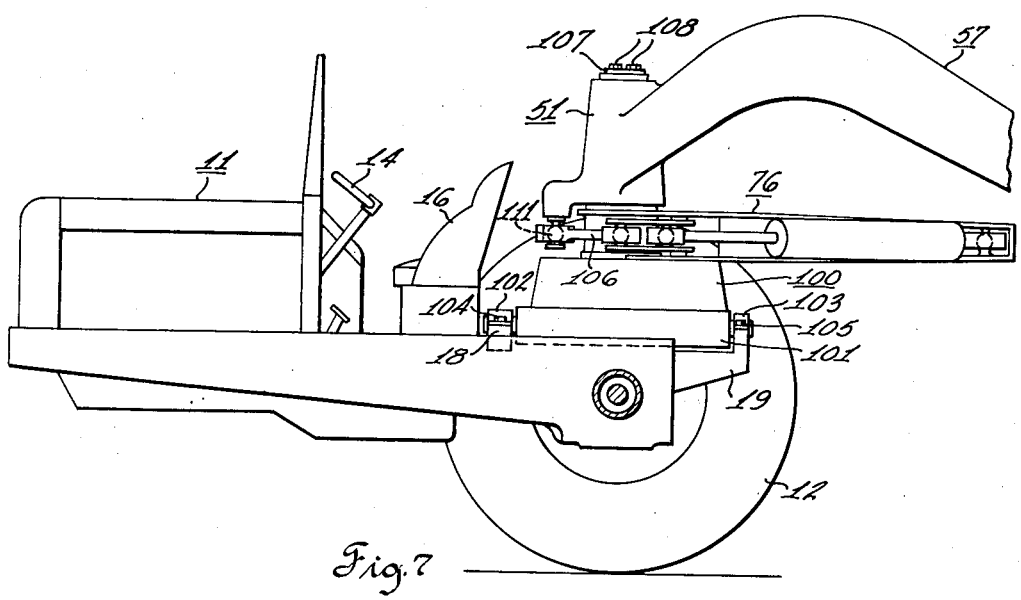
FIG. 7 is a side view of a two wheel type tractor connected to a trailer by a hitch of conventional construction.

FIGS. 6 and 7 illustrate the interchangeability of the hitch of my invention (FIG. 6) and a conventional hitch (FIG. 7) which is more fully shown in Harvey W. Rockwell's Patent U.S. 2,885,022, issued May 5, 1959, on a steering mechanism. My hitch may be offered for sale as an optional factory installed item or as a field replacement. The horizontal kingpin member 17 of my hitch is connected to the tractor 11 by the same brackets 18, 19, as are employed to mount the kingpin frame 101 of the conventional hitch 100. To remove the conventional hitch 100, shown in FIG. 7, the caps 102, 103 are removed from the brackets 18, 19 by removing cap screws 104, 105. The caps are removed from the front end of steering links 106, only one of which is shown, to disconnect from the ball pins 111, only one of which is shown, and the vertical kingpin retainer plate 107 is removed by removing bolts 108. The trailer yoke 57 may then be removed from the vertical kingpin portion of the conventional hitch 100 and from the steering links 106 of the steering mechanism 76, and the kingpin frame 101 is removed from the bottom portions of brackets 18, 19. The hitch of my invention may then be readily installed by connecting to the same attaching points. Thus my hitch is not only adapted for use with both two and four wheel tractors but is also interchangeable with a conventional two wheel tractor hitch such as is shown in FIG. 7.

From the foregoing description, it is obvious that a novel hitch construction has been provided which may be used with two wheel or four wheel tractor units. The hitch is compact, requiring only a pair of connecting brackets on the tractor for the longitudinal hitch member 17. Compactness results from my providing motor means 32, 33 between the first and second hitch members 17, 26 for controlling relative pivotal movement therebetween about transverse axis 31. The hitch is not only compact but the tractor tilting mechanism is built into the hitch thereby permitting field substitution of my hich for the conventional hitch on the tractor scraper. My hitch may also be offered as a factory installed option in the two wheel type tractor and scraper combination.

My invention may be embodied in hitches other than shown and described herein, and it is intended that my invention shall include such other constructions as are within the scope of the appended claims.

This application is a continuation-in-part of applicant's copending application Serial No. 101,875, filed April 10, 1961, and now abandoned.

Having now particularly described and ascertained the nature of my said invention and the manner in which it is to be performed, I declare that what I claim is:

1. In an articulated self-propelled vehicle of the type including a tractor unit and a trailing unit, a hitch apparatus comprising a first hitch member connected on said tractor unit for pivotal movement on a pivot axis extending longitudinally of the tractor unit; a second hitch member pivotally connected on said first hitch member for relative pivotal movement on a horizontal axis extending transversely of said tractor unit, said second hitch member also being connected to said trailing unit for relative pivotal movement on a vertical pivotal axis; and motor means interposed between said first and second hitch members for controlling relative pivotal movement therebetween about said transverse horizontal axis.

2. A hitch adapted for use in a vehicle having front and rear wheeled units, comprising: a first member adapted for pivotal connection to one of said units for rotation about a longitudinal axis, a second member adapted for pivotal connection to the other of said units for rotation about a vertical axis, means pivotally interconnecting said members for rotation about a transverse axis and motor means interposed between said members and operative to pivot said members relative to one another about said transverse axis.

3. In an articulated self-propelled vehicle of the type including a tractor unit and a trailing unit, a hitch apparatus comprising a first hitch member connected on said tractor unit for pivotal movement on a pivot axis extending longitudinally of the tractor unit; a second hitch member pivotally connected on said first hitch member for relative pivotal movement on a horizontal axis extending transversely of said tractor unit, said second hitch member also being connected to said trailing unit for relative pivotal movement on a vertical pivot axis; and a pair of fluid motors operatively interposed between said first and second hitch members at opposite lateral sides, respectively, of said first hitch member for tilting said tractor unit relative to said trailing unit about said transverse horizontal axis.

4. In an articulated self-propelled vehicle of the type including a tractor unit and a trailing unit, a hitch apparatus comprising a first hitch member; means for connecting said member on said tractor unit for pivotal movement on a horizontal pivot axis extending longitudinally of the tractor unit; a second hitch member; means for pivotally connecting said second hitch member on said first hitch member for relative pivotal movement on a horizontal axis extending transversely of said tractor unit; means for connecting said second hitch member to said trailing unit for relative pivotal movement on a vertical pivot axis; steering means for controlling relative horizontal swinging movement between said tractor and trailer units about said vertical pivot axis, said steering means being interposed between said trailing unit and said second hitch member and a pair of motor means operatively interposed between said first and second hitch members at opposite lateral sides of said first hitch member for controlling the angle of adjustment between said hitch members about said transverse horizontal axis.

5. In an articulated self-propelled earth moving vehicle of the type including a single axle tractor unit and a single axle scraper unit, a hitch apparatus comprising a first hitch member; means for connecting said member on the main frame of said tractor unit for pivotal movement on a horizontal pivot axis extending longitudinally of the tractor unit; a second hitch member; means for pivotally connecting said second hitch member on said first hitch member for relative pivotal movement on a horizontal axis extending transversely of said tractor unit; means for connecting said second hitch member to said trailing unit for relative pivotal movement on a vertical pivot axis; and a pair of expansible and contractible fluid motors disposed at opposite lateral sides, respectively, of said first hitch member and each including a pair of relatively movable elements pivotally connected, respectively, to said first and second hitch members; and fluid pressure means including control means for operating said fluid motors to control the angle of adjustment between said tractor unit and scraper unit about said transverse horizontal axis.

6. In an articulated self-propelled earth moving vehicle of the type including a single axle tractor unit and a single axle scraper unit having yoke and bowl components pivotally interconnected on a transverse axis forward of the axle of said scraper unit, a hitch apparatus comprising a first hitch member; means for connecting said member on the main frame of said tractor unit for pivotal movement on a horizontal pivot axis extending longitudinally of the tractor unit; a second hitch member; means for pivotally connecting said second hitch member on said first hitch member for relative pivotal movement on a horizontal axis extending transversely of said tractor unit; means for connecting said second hitch member to said trailing unit for relative pivotal movement on a vertical pivot axis; steering means for controlling horizontal swinging movement of said tractor unit about said vertical pivot axis operatively interposed between said trailing unit and said second hitch member; and motor means interposed between said first and second hitch members for controlling the angle of adjustment between said tractor unit and scraper unit about said transverse horizontal axis.

References Cited in the file of this patent

UNITED STATES PATENTS

| | | |
|---|---|---|
| 2,633,366 | Armington | Mar. 31, 1953 |
| 2,833,556 | Kling | May 6, 1958 |
| 2,872,993 | Toth | Feb. 10, 1959 |
| 2,936,039 | Rockwell | May 10, 1960 |